(12) United States Patent
Kim et al.

(10) Patent No.: US 10,936,397 B2
(45) Date of Patent: Mar. 2, 2021

(54) HYBRID CONTROL MODULE STATUS COMMUNICATION SYSTEM AND METHOD

(71) Applicant: FORD GLOBAL TECHNOLOGIES, LLC, Dearborn, MI (US)

(72) Inventors: Junghoon Kim, Ann Arbor, MI (US); Yuqing Tang, Northville, MI (US); Bader M. Badreddine, Dearborn Heights, MI (US); Matthew Allan Herrmann, Royal Oak, MI (US); Ahmad Hazime, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 145 days.

(21) Appl. No.: 16/420,873

(22) Filed: May 23, 2019

(65) Prior Publication Data

US 2020/0371783 A1    Nov. 26, 2020

(51) Int. Cl.
*G06F 11/07* (2006.01)
*H04L 12/40* (2006.01)

(52) U.S. Cl.
CPC ...... *G06F 11/0772* (2013.01); *G06F 11/0739* (2013.01); *H04L 2012/40273* (2013.01)

(58) Field of Classification Search
CPC ............... G06F 11/0736; G06F 11/739; G06F 11/0754; G06F 11/757; G06F 11/76; G06F 11/0763; G06F 11/0766; G06F 11/0772; G06F 11/793; G06F 11/796; G06F 11/2028; G06F 11/3013; G05B 23/0289; G05B 23/0291; G05B 2219/24125; G05B 2219/25158; B60W 50/0205; B60W 2050/021; B60W 50/0225; B60W 50/029; B60W 2050/0292; B60W 2050/0295; B60W 2050/0297; B60W 50/035
See application file for complete search history.

(56) References Cited

U.S. PATENT DOCUMENTS

| | | |
|---|---|---|
| 4,133,027 A | 1/1979 | Hogan |
| 7,418,316 B2 | 8/2008 | Pfeufer et al. |
| 7,610,521 B2 | 10/2009 | Kuramochi et al. |
| 2002/0198638 A1* | 12/2002 | Haag ................ B60T 8/885 701/1 |
| 2005/0022060 A1* | 1/2005 | Hashimoto ........ G05B 19/0428 714/37 |
| 2005/0268178 A1* | 12/2005 | Hagman ............ G05B 19/0428 714/47.1 |

(Continued)

OTHER PUBLICATIONS

Wikipedia, "CAN bus", Nov. 8, 2018. (Year: 2018).*

*Primary Examiner* — Gabriel Chu
(74) *Attorney, Agent, or Firm* — Brooks Kushman PC; David Kelley

(57) ABSTRACT

A vehicle includes a controller having a microcontroller and a monitoring processor. The controller includes a bus transceiver for communicating on an external communication bus. The controller is configured such that each of the microcontroller and the monitoring processor can output a transmit data signal to the bus transceiver. The source of the transmit data signal is selected as the output of the monitoring processor responsive to evaluating the microcontroller as being inoperative.

18 Claims, 2 Drawing Sheets

(56) References Cited

U.S. PATENT DOCUMENTS

| | | | |
|---|---|---|---|
| 2007/0016340 A1* | 1/2007 | Soudier | B60L 3/04 |
| | | | 701/1 |
| 2009/0138137 A1* | 5/2009 | Iwagami | G06F 11/0739 |
| | | | 701/1 |
| 2009/0312898 A1* | 12/2009 | Hashimoto | G05B 19/0428 |
| | | | 701/29.1 |
| 2011/0257833 A1* | 10/2011 | Trush | G07C 5/0808 |
| | | | 701/31.4 |
| 2014/0082434 A1* | 3/2014 | Knight | G06F 11/0739 |
| | | | 714/55 |
| 2014/0149809 A1* | 5/2014 | Bisht | G06F 11/0739 |
| | | | 714/55 |
| 2015/0095724 A1* | 4/2015 | Park | G05B 23/0221 |
| | | | 714/55 |
| 2015/0213277 A1* | 7/2015 | Zhao | G06F 21/44 |
| | | | 713/189 |
| 2018/0231948 A1* | 8/2018 | Mori | G05B 23/0297 |
| 2018/0357118 A1* | 12/2018 | Jang | G06F 11/0724 |
| 2019/0079835 A1* | 3/2019 | You | G06F 11/0757 |
| 2019/0179693 A1* | 6/2019 | Kim | G06F 11/0757 |

* cited by examiner

HYBRID CONTROL MODULE STATUS COMMUNICATION SYSTEM AND METHOD

TECHNICAL FIELD

This application generally relates to maintaining network communication when a processor is inoperable.

BACKGROUND

Modern vehicles include many electronic control modules. The electronic control modules may communicate over a vehicle network. An electronic control module may include various features to prevent unexpected operation in the event of a processor being inoperable. A typical electronic control module will disable network communication in the presence of a processor being inoperable. While this prevents unreliable information from being sent to other modules, it does not identify the status to the other control modules.

SUMMARY

A vehicle includes a controller. The controller includes a multiplexor and a microcontroller programmed to output a first transmit output to the multiplexor that is based on received data from a bus transceiver. The controller further includes a monitor processor programmed to, responsive to detecting that the microcontroller is inoperable, generate a second transmit output to the multiplexor that is independent of the received data, and cause the multiplexor to change from passing the first transmit output to the bus transceiver to passing the second transmit output to the bus transceiver for output to a vehicle network.

The microcontroller may be further programmed to, responsive to detecting that the microcontroller is inoperable, cause the multiplexor to change from passing the first transmit output to passing the second transmit output. The monitor processor may be further programmed to generate a question bit sequence having a predetermined answer bit sequence and transfer the question bit sequence to the microcontroller. The monitor processor may be further programmed to detect that the microcontroller is inoperative responsive to receiving an answer bit sequence from the microcontroller that does not match the predetermined answer bit sequence. The monitor processor may be further programmed to, responsive to the second transmit output being passed to the bus transceiver, output a status indicative of the microcontroller being inoperable via the second transmit output. The monitor processor may be further programmed to set the second transmit output to a constant voltage level. The bus transceiver may be a Controller Area Network (CAN) transceiver. Only the microcontroller may be coupled to a receive data output of the bus transceiver.

A vehicle includes a controller including a microcontroller programmed to output a bus message as a bit sequence. The controller further includes a monitor processor programmed to receive the bit sequence and, responsive to evaluating the microcontroller as being operable, output the bit sequence to a bus transceiver for transfer over a communication bus, and, responsive to evaluating the microcontroller as being inoperable, replace the bit sequence with a status message bit sequence and output the status message bit sequence to the bus transceiver.

The microcontroller may be further programmed to output a signal to the monitor processor that is indicative of the microcontroller being inoperable. The monitor processor may be further programmed to, responsive to the signal being indicative of the microcontroller being inoperative, change from outputting the bit sequence to the bus transceiver to outputting the status message bit sequence to the bus transceiver. Only the microcontroller may be electrically coupled to a receive data output of the bus transceiver. The status message bit sequence may be defined such that each bit is a same constant value. The monitor processor may be programmed to generate a question bit sequence having a predetermined answer bit sequence and evaluate the microcontroller as being operable responsive to the microcontroller responding to the question bit sequence with an answer bit sequence that matches the predetermined answer bit sequence. The monitor processor may be programmed to generate a question bit sequence having a predetermined answer bit sequence and evaluate the microcontroller as being operable responsive to the microcontroller responding to the question bit sequence with an answer bit sequence that matches the predetermined answer bit sequence within a predetermined amount of time. The bit sequence may be based on data received from the bus transceiver and the status message bit sequence may be independent of data received from the bus transceiver.

A method includes outputting, by a microcontroller, a message bit sequence that includes a subsequence of bits that is responsive to data received from a vehicle network via a bus transceiver. The method further includes receiving, by a monitor processor, the message bit sequence and evaluating, by the monitor processor, an operating status of the microcontroller. The method further includes passing, by the monitor processor, the message bit sequence to the bus transceiver for transfer over the vehicle network responsive to the operating status being operable. The method further includes replacing, by the monitor processor, the message bit sequence with a status message bit sequence that is independent of data received from the vehicle network and transferring the status message bit sequence to the bus transceiver responsive to the operating status being inoperable.

The method may further include evaluating, by the monitor processor, the operating status as being inoperable responsive to the microcontroller responding to a question bit sequence with an answer bit sequence that does not match a predetermined answer bit sequence corresponding to the question bit sequence. The method may further include generating, by the monitor processor, the status message bit sequence such that each bit has a same constant value.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A vehicle may include multiple control modules communicating over a network. Each control module may have a single control unit for managing the network communication. Under some conditions, the single control unit may have issues and be unable to manage the network communication. If the single control unit has an inoperable processor, it may not be possible to transfer data over the network. The other control modules that are connected to the network may not receive a timely indication of the status. A more robust system may ensure that a control unit can transfer a reliable status indication to other control modules.

In the event of an inoperable control unit, other control modules may fail to recognize the condition. In some cases, the inoperable control unit may continue to send message data over the network. However, the inoperable control unit may be sending the same message without updating the contents. In other cases, the inoperable control unit may be sending random message data over the network. A mechanism for allowing other control modules to identify the inoperable control unit in a timely manner may make the system more robust. Some system may intentionally disable communication responsive to detecting an inoperable control unit. However, such systems may require expiration of a period of time before other controllers can recognize the condition of messages no longer being received.

Figure 1:
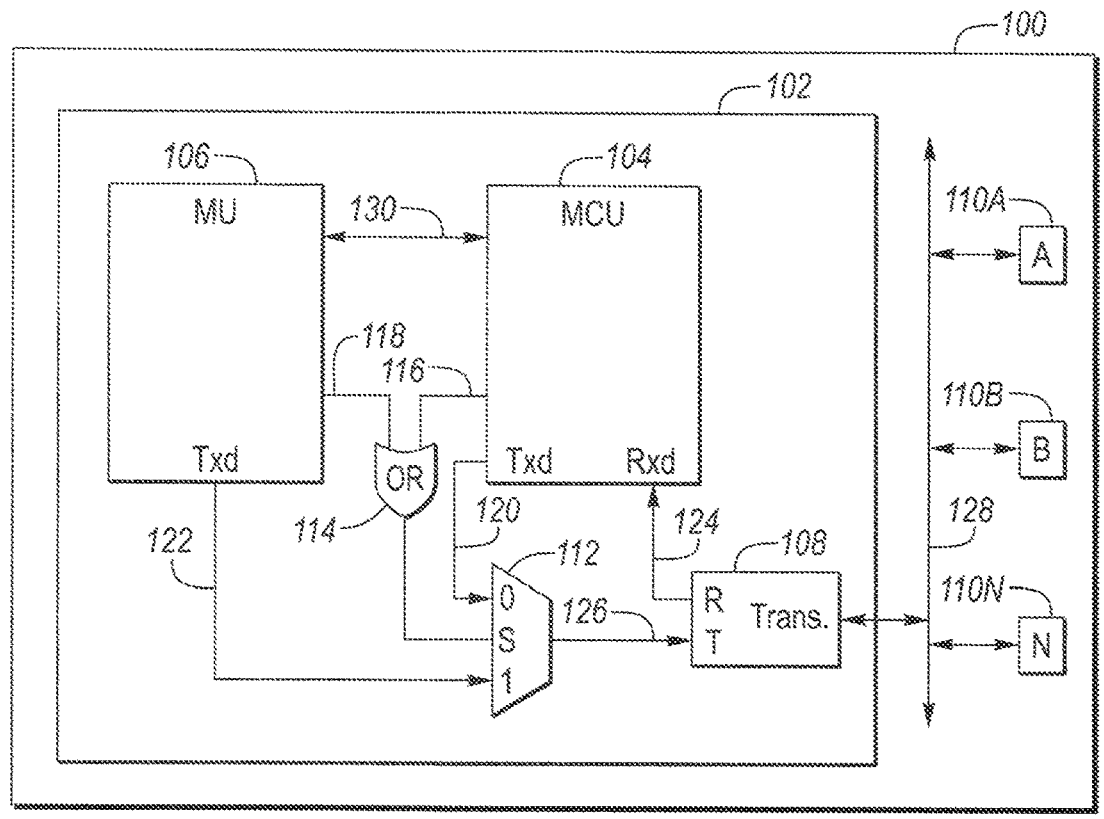
FIG. 1 depicts a possible arrangement for a controller in a vehicle.

FIG. 1 depicts a block diagram for a possible configuration for a controller in a vehicle to improve detectability of an inoperable processor by other controllers coupled to a network. A vehicle 100 may include a controller 102. The controller 102 may include a microcontroller or microcontroller unit (MCU) 104. The MCU 104 may include a processor configured to execute instructions and programs. The MCU 104 may include volatile and nonvolatile memory for storing instructions and data.

The controller 102 may further include a monitor processor or monitoring unit 106 that is configured to evaluate the operation of the MCU 104. The monitoring unit 106 may include a processor and volatile and nonvolatile memory. The MCU 104 and the monitoring unit 106 may communicate via a first communication bus 130. The first communication bus 130 may be a serial peripheral interface (SPI) bus. The MCU 104 and the monitoring unit 106 may include appropriate hardware and software components for communicating via the first communication bus 130.

The monitoring unit 106 may be programmed to evaluate whether or not the MCU 104 is operating properly. The monitoring unit 106 may evaluate the operating status of the MCU 104. The MCU 104 may be programmed to communicate with the monitoring unit 106 via the first communication bus 130. The monitoring unit 106 may be programmed to implement a question and answer strategy for determining the operational status of the MCU 104. The monitoring unit 106 may be configured to selectively output a disable/shutdown signal to disable outputs of the controller 102.

The question and answer strategy may include the monitoring unit 106 generating a question bit sequence. The question bit sequence may be a bit sequence for which there is a predetermined answer bit sequence. The monitoring unit 106 may transmit the question bit sequence via the first communication bus 130 to the MCU 104. The MCU 104 may receive the question bit sequence and generate an answer bit sequence based on the question bit sequence. For example, a lookup table that includes an answer bit sequence for each possible question bit sequence may be stored in the memory of the MCU 104. The MCU 104 may index the lookup table using the question bit sequence and retrieve the corresponding answer bit sequence. Other examples may include defining a specific algorithm to process the question bit sequence to generate the answer bit sequence. The MCU 104 may then send the answer bit sequence via the first communication bus 130 to the monitoring unit 106.

The monitoring unit 106 may receive the answer bit sequence from the MCU 104. If the answer bit sequence is not received within a predetermined time of sending the question bit sequence, the monitoring unit 106 may suspect a problem with the MCU 104. When received, the monitoring unit 106 may compare the answer bit sequence to the predetermined answer bit sequence. For example, the monitoring unit 106 may determine the predetermined answer bit sequence from a lookup table or by executing a predetermined algorithm. If the answer bit sequence and the predetermined answer bit sequence do not match, then the monitoring unit 106 may suspect a problem with the MCU 104. For example, program or data memory could be corrupted resulting in the MCU 104 generating improper results. Responsive to the answer bit sequence not matching the predetermined answer bit sequence, the monitoring unit 106 may change the state of a signal to inhibit further operation of the MCU 104.

The vehicle 100 may include other controllers 110 that are in communication with the controller 102 over a vehicle communication bus 128. The other controllers 110 may coordinate with the controller 102 to implement features and functions of a vehicle subsystem (e.g., powertrain, braking system). The controller 102 may include a bus transceiver 108. The bus transceiver 108 may be configured to interface the controller 102 to the vehicle communication bus 128. The vehicle communication bus 128 may be a Controller Area Network (CAN) bus and the bus transceiver 108 may be configured to communicate via CAN. Other configurations are possible for the vehicle communication bus 128 including a Local Interconnect Network (LIN) bus, a Media Oriented System Transport (MOST) bus, an Ethernet bus, or a FlexRay bus.

During normal operation, the MCU 104 may interface with the bus transceiver 108 to receive and transmit data. The bus transceiver 108 may generate a receive data output 124 that couples a receive data port of the bus transceiver 108 to a receive input of the MCU 104. The bus transceiver 108 may transfer data received from the vehicle communication bus 128 to the MCU 104 via the receive data output 124 according to a predetermined format and protocol. For example, the bus transceiver 108 may translate messages received from the vehicle communication bus 128 to a bit sequence to be transferred via the receive data output 124.

The bus transceiver 108 may include a port or input that receives transmit data via a transmit data input 126. The bus transceiver 108 may be configured to translate a bit sequence received from the transmit data input 126 to a predetermined format and protocol compatible with the vehicle communication bus 128.

The other controllers 110 may transmit messages on the vehicle communication bus 128 that include command and feedback information. The transmit data may be represented as a bit sequence that is provided to the bus transceiver 108. The MCU 104 may receive the command and feedback data from the receive data output 124 and may operate the controller 102 based on the received data. The MCU 104 may generate transmit data based on the received command and feedback data. For example, the MCU 104 may transmit a response to the other controllers 110 that provides a status (e.g., completed, in progress, or failed) of the received command. In other examples, the received data may include setpoint data which may cause a change in a corresponding measurement value that is reported by the controller 102. As such, at least some of the transmit data (e.g., a subsequence of bits) of the MCU 104 may be based on data received from the other controllers 110.

In a traditional configuration, the MCU 104 would be coupled directly to the transmit data input 126. However, in the event of a condition with the MCU 104, it is possible that the controller 102 could continue sending data via the transmit data input 126. The data may then be sent over the vehicle communication bus 128 and provide a false impression to the other controllers 110 that the MCU 104 is still operable.

An improved strategy is to ensure that information transferred over the vehicle communication bus 128 is reliable. In the event of the MCU 104 being inoperable, the monitoring unit 106 may be configured to generate a transmit data output for the transmit data input 126 of the bus transceiver 108 to replace the output of the MCU 104. To achieve this, the controller 102 may include a multiplexor 112 that is configured with an output to drive the transmit data input 126. The multiplexor 112 may be configured to selectively pass an MCU transmit data output 120 and a monitoring unit transmit data output 122 to the transmit data input 126 of the bus transceiver 108. The multiplexor 112 may include a selection input that determines which of the transmit data outputs is passed to the transmit data input 126 of the bus transceiver 108.

The selection input may take on digital values of zero (low voltage level) or one (high voltage level). For example, when the selection input is set to zero, the multiplexor 112 may pass the MCU transmit data output 120. When the selection input is set to one, the multiplexor 112 may pass the monitoring unit transmit data output 122. The selection input may be asserted (e.g., set to high level) by outputs generated by the MCU 104 or the monitoring unit 106.

The monitoring unit 106 may output a first transmit selection output 118. The MCU 104 may output a second transmit selection output 116. The second transmit selection output 116 may be coupled to an input of the monitoring unit 106 to provide status to the monitoring unit 106. A digital OR gate 114 may be configured to input the first transmit selection output 118 and the second transmit selection output 116 and output a selection output that is the logical or of the two inputs. During normal operation, the first transmit selection output 118 and the second transmit selection output 116 may be set to zero (e.g., not asserted). During normal operating conditions, the selection output is zero and the multiplexor 112 outputs the MCU transmit data output 120 to the transmit data input 126.

In other configurations, the OR function may be implemented as a program in the monitoring unit 106. For example, the monitoring unit 106 may receive the second transmit selection output 116 and convert the signal to a digital value. The monitoring unit 106 may generate an output for the selection input in the same manner as the first transmit selection output 118 is generated but with the inclusion of an OR condition with the digital value.

The source of the transmit data input 126 may change responsive to the monitoring unit 106 asserting the first transmit selection output 118. If the first transmit selection output 118 is asserted, the selection output changes to the high level (one) and causes the multiplexor 112 to output the monitoring unit transmit data output 122 to the transmit data input 126. The source of the transmit data input 126 may also change if the MCU 104 asserts the second transmit selection output 116. The selection output becomes asserted (e.g., set to high level) in response to one or both of the first transmit selection output 118 and the second transmit selection output 116 being asserted.

The monitoring unit 106 may assert the first transmit selection output 118 responsive to detecting an operating issue with the MCU 104 and/or evaluating the MCU 104 as being inoperable. For example, a failed answer bit sequence to a question bit sequence may trigger the monitoring unit 106 to assert the first transmit selection output 118. In addition, an answer bit sequence that is not received within a predetermined time of the question bit sequence being sent may trigger the monitoring unit 106 to assert the first transmit selection output 118. The monitoring unit 106 may be programmed to generate an appropriate signal for the monitoring unit transmit data output 122. Responsive to detecting the operating issue with the MCU 104, the monitoring unit 106 may generate the monitoring unit transmit data output 122. As the monitoring unit 106 is not coupled to the receive data output 124, the monitoring unit transmit data output 122 is independent of any received data from the vehicle communication bus 128.

In some configurations, the monitoring unit 106 may output the monitoring unit transmit data output 122 in a format and protocol defined by the bus transceiver 108. For example, the monitoring unit transmit data output 122 may define a message for the vehicle communication bus 128 that represents a valid message that the other controllers 110 may receive and decode. the message may include a status indication. The message may include specific diagnostic information so that the other controllers 110 can take appropriate action. For example, the diagnostic message may include information so that the other controllers 110 may recognize the inoperable status of the MCU 104 of the controller 102 and transition to a reduced performance mode of operation. The monitoring unit 106 may output a status indicative of the MCU 104 being inoperable. In some configurations, the monitoring unit 106 may redundantly monitor some sensor inputs of the controller 102. In these configurations, the monitoring unit 106 may process and send the sensor information via the monitoring unit transmit data output 122. That is, the monitoring unit 106 may be configured to implement at least a portion of the bus communication protocol as a backup for a predetermined subset of messages or signals normally sent by the MCU 104.

In the reduced performance mode of operation, the other controllers 110 may disable vehicle subsystem features and functions that rely on information received from the controller 102. The other controllers 110 may disable features and functions that rely on commands sent to the controller 102. In addition, responsive to receiving the diagnostic information, the other controllers 110 may store a diagnostic trouble code (DTC) indicative of the condition of the controller 102. The DTC may allow a service technician to efficiently isolate the issue as being related to the controller 102.

In some configurations, the monitoring unit 106 may output the monitoring unit transmit data output 122 as a constant voltage level (e.g., a high level such as 5 Volts). In this case, the output port used for the monitoring unit transmit data output 122 does not need to have an associated bus controller (e.g., CAN controller/management unit) to generate the output. In this case, an empty message comprised of a bit sequence in which all the bits are a same constant value (e.g., one) may be transferred on the vehicle communication bus 128. The monitoring unit 106 can place the transmit data input 126 in a known condition. This prevents any unexpected operation of the MCU transmit data output 120 during an MCU malfunction. As such, there is less risk of unreliable or invalid messages being transferred to the other controllers 110 over the vehicle communication bus 128. The other controllers 110 may interpret the resulting message as a status of the controller 102.

Figure 2:
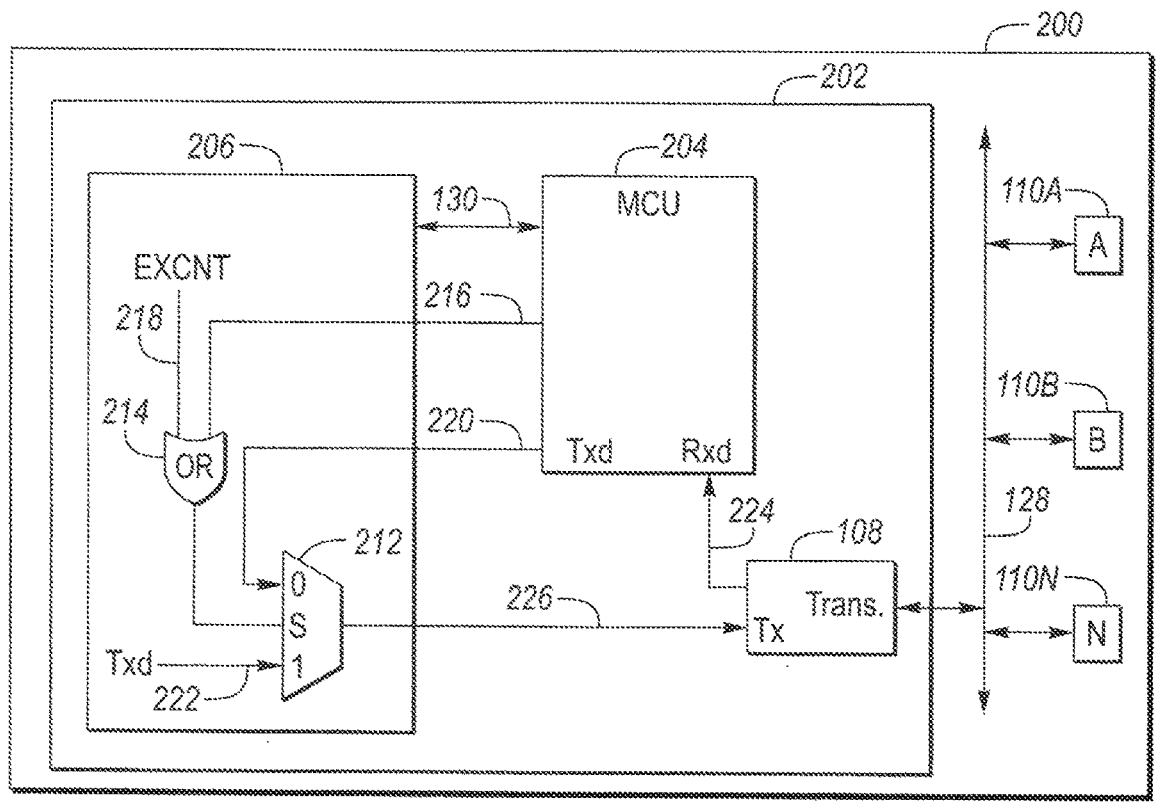
FIG. 2 depicts another possible arrangement for a controller in a vehicle.

FIG. 2 depicts an alternative configuration. A vehicle 200 may include a controller 202. The controller 202 may include a microcontroller unit (MCU) 204. The MCU 204 may include a processor configured to execute instructions and programs. The MCU 204 may include volatile and nonvolatile memory for storing instructions and data.

The controller 202 may include a monitoring unit 206 that is configured to evaluate the operation of the MCU 204. The monitoring unit 206 may include a processor and volatile and nonvolatile memory. The MCU 204 and the monitoring unit 206 may communicate via a first communication bus 130. The first communication bus 130 may be a serial peripheral interface (SPI) bus. The MCU 204 and the monitoring unit 206 may include appropriate hardware and software components for communicating via the first communication bus 130.

The monitoring unit 206 may be programmed to verify that the MCU 204 is executing properly. That is, the monitoring unit 206 may evaluate the MCU 204 as being operable or inoperable. The monitoring unit 206 may evaluate whether a condition is present in the MCU 204 that renders the MCU 204 inoperable. The MCU 204 may be programmed to communicate with the monitoring unit 206 via the first communication bus 130. The monitoring unit 206 may be programmed to implement a question and answer strategy for determining the operational status of the MCU 204. The monitoring unit 206 may output a disable/shutdown signal to disable outputs of the controller 202. The question and answer strategy may function as previously described herein.

The vehicle 200 may include other controllers 110 that are in communication with the controller 202 over a vehicle communication bus 128. The controller 202 may include a bus transceiver 108. The bus transceiver 108 may be configured to interface the controller 202 to the vehicle communication bus 128. The vehicle communication bus 128 may be a Controller Area Network (CAN) bus and the bus transceiver 108 may be configured to communicate via CAN. Other configurations are possible for the vehicle communication bus 128 including a Local Interconnect Network (LIN) bus, a Media Oriented System Transport (MOST) bus, an Ethernet bus, or a FlexRay bus.

The bus transceiver 108 may generate a receive data output 224 that couples a receive data port of the bus transceiver 108 to a receive input of the MCU 204. The bus transceiver 108 may transfer data received from the vehicle communication bus 128 to the MCU 204 via the receive data output 224 according to a predetermined format and protocol. For example, the bus transceiver 108 may translate messages received from the vehicle communication bus 128 to a bit sequence to be transferred via the receive data output 224. The MCU 204 may generate transmit data that is based on received command and feedback data from the receive data output 224.

The bus transceiver 108 may include a port or input that receives transmit data via a transmit data input 226. The bus transceiver 108 may be configured to translate a bit sequence received from the transmit data input 226 to a predetermined format and protocol compatible with the vehicle communication bus 128. In this configuration, the transmit data signal 226 is provided by the monitoring unit 206. The monitoring unit 206 may include a multiplexor 212 that is configured to generate the transmit data output 226. The multiplexor 212 may be implemented in hardware or as part of a program executed by the monitoring unit 206.

The MCU 204 may generate an MCU transmit data output 220. The processor of the monitoring unit 206 may generate a monitoring unit transmit data output 222. The multiplexor 212 may be configured to select between the MCU transmit data output 220 and a monitoring unit transmit data output 222. The multiplexor 212 may further include a selection input that determines which of the transmit data outputs is passed to the bus transceiver 108. Operation of the selection input may be as described previously herein.

The processor of the monitoring unit 206 may generate a first transmit selection signal or output 218. The MCU 204 may output a second transmit selection output 216. The MCU 204 may assert the second transmit selection output 216 under conditions that are indicative of the MCU 204 being inoperative. The monitoring unit 206 may include a digital OR gate 214 that is configured to input the first transmit selection output 218 and the second transmit selection output 216 and generate a selection output that is the logical OR of the two inputs. Under normal operation, the first transmit selection output 218 and the second transmit selection output 216 may be set to zero. In this condition, the selection output is zero and causes the multiplexor 212 to pass the MCU transmit data output 220 to the transmit data output 226.

The MCU 204 may transfer a bus message as a bit sequence via the MCU transmit data output 220. The monitoring unit 206 may be configured or programmed to receive the bit sequence and, responsive to evaluating the MCU 204 as being operable, output the bit sequence to the bus transceiver 108 for transfer over the vehicle communication bus 128. The monitoring unit 206 may be further configured to, responsive to evaluating the MCU 204 as being inoperable, replace the bit sequence with a status message bit sequence and transfer the status message bit sequence to the bus transceiver 108. In some configurations, the status message bit sequence may be defined such that each bit is a same value (e.g., a one). That is, the monitoring unit 206 may output a constant voltage level (e.g., high level) to the transmit data signal 226. In this case, the output port used to generate the transmit data output 226 does not need to have an associated bus controller (e.g., CAN controller/management unit) to generate the output. In this case, an empty message comprised of a bit sequence in which all the bits are a same constant value (e.g., one) may be transferred on the vehicle communication bus 128.

The difference between the configuration of FIG. 1 and FIG. 2 are described here. The configuration of FIG. 2 incorporates the multiplexor 212 and the OR gate 214 within the monitoring unit 206. These functions may be implemented in hardware via physical componentry. The functions may also be implemented by a program executed in the monitoring unit 206. For example, the processor of the monitoring unit 206 may be programmed receive the bus message data and bit sequences from the MCU transmit data output 220 via a processor input. The monitoring unit 206 may receive the second transmit selection output 216 via a digital input. The monitoring unit 206 may be programmed to output the transmit data output 226 via a processor output. The monitoring unit 206 may be programmed to implement the multiplexor and selection strategy. The overall strategy may be similar for FIG. 1 and FIG. 2. The other controllers 110 may be unable to detect a difference between the configurations.

In each configuration, the receive data output from the bus transceiver 108 may only be routed to the MCU. In the event of an MCU condition, normal operation may be inhibited. Since full operation will be inhibited, receive data need not be processed. The monitoring unit may not be required to have a full bus interface (hardware and software) for accommodating the receive input. Such a configuration may minimize cost and complexity of the monitoring unit. At least some of the data transmitted by the MCU may be based on the received data. In contrast, data transmitted by the monitoring unit is independent of the received data.

Figure 3:
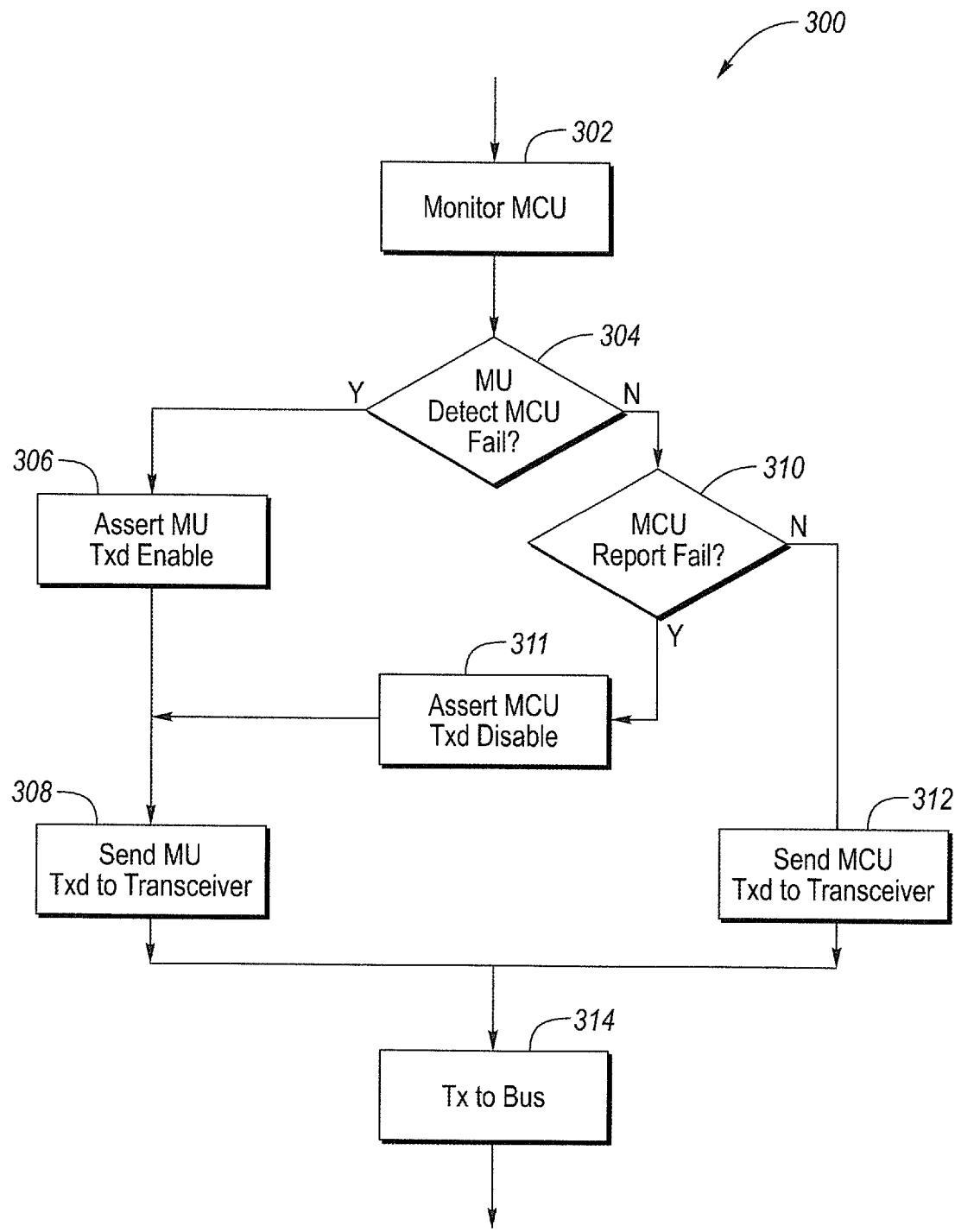
FIG. 3 depicts a flow chart for a possible sequence of operations for managing network communication in the presence of a controller being inoperable.

FIG. 3 depicts a flow chart for a possible sequence of operations that may implemented by the controller (e.g., 102, 202). At operation 302, the monitor processor 106 may monitor the MCU 104 and evaluate the operation status of the MCU 104. For example, the question and answer strategy may be defined and executed to monitor the operation of the MCU 104. At operation 304, a check may be performed to determine if the monitoring unit 104 has detected an MCU condition. If an MCU condition is detected, operation 306 may be performed.

At operation 306, the monitoring unit 106 may assert an output or signal to cause the monitoring unit transmit output 122 to be transferred to the bus transceiver 108. For example, the monitoring unit 106 may be programmed to assert the first transmit selection output 118 that can control operation of the multiplexor 112. At operation 308, the monitoring unit transmit output 122 may be transferred to the bus transceiver 108 and onto the vehicle network 128.

If the monitoring unit 106 has not detected an MCU condition, operation 310 may be performed. At operation 310, a check may be performed to determine if the MCU 104 has reported a condition indicative of the MCU 104 being inoperable. If the MCU 104 has reported a condition, operation 311 may be performed. At operation 311, the MCU 104 may assert an MCU transmit disable signal. For example, the MCU 104 may assert the second transmit selection output 116. Operation 308 may then be performed to transfer the monitoring unit transmit data 122 to the bus transceiver 108.

If the MCU has not reported a condition, operation 312 may be performed. At operation 312, the MCU 104 may cause the MCU transmit output 120 to be passed to the bus transceiver 108. At operation 314, the bus transceiver 108 may transfer the transmit data to the vehicle network 128. The operations may be repeated periodically.

The system and strategy described permits continued operation of the communication network in the event of an MCU condition. By incorporating a redundant transmit source within the controller 102, data transmission may be continued with reliable data. The controller 102 may at least be able to transmit status information to the other controllers 110 to permit improved diagnosis of controller malfunctions. In addition, the strategy ensures that data transmitted on the vehicle network is reliable in the presence of a processor malfunction.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:
1. A vehicle comprising:
   a controller including
      a multiplexor,
      a microcontroller programmed to output a first transmit output to the multiplexor that is based on received data from a bus transceiver, and
      a monitor processor programmed to, responsive to detecting that the microcontroller is inoperable,
   generate a second transmit output to the multiplexor that is independent of the received data, and
   cause the multiplexor to change from passing the first transmit output to the bus transceiver to passing the second transmit output to the bus transceiver for output to a vehicle network,
   wherein the microcontroller is further programmed to, responsive to detecting that the microcontroller is inop- erable, cause the multiplexor to change from passing the first transmit output to passing the second transmit output.

2. The vehicle of claim 1, wherein the monitor processor is further programmed to generate a question bit sequence having a predetermined answer bit sequence and transfer the question bit sequence to the microcontroller.

3. The vehicle of claim 2, wherein the monitor processor is further programmed to detect that the microcontroller is inoperative responsive to receiving an answer bit sequence from the microcontroller that does not match the predetermined answer bit sequence.

4. The vehicle of claim 1, wherein the monitor processor is further programmed to, responsive to the second transmit output being passed to the bus transceiver, output a status indicative of the microcontroller being inoperable via the second transmit output.

5. The vehicle of claim 1, wherein the monitor processor is further programmed to set the second transmit output to a constant voltage level.

6. The vehicle of claim 1, wherein the bus transceiver is a Controller Area Network (CAN) transceiver.

7. The vehicle of claim 1, wherein only the microcontroller is coupled to a receive data output of the bus transceiver.

8. A vehicle comprising:
a controller including
a microcontroller programmed to output a bus message as a bit sequence; and
a monitor processor programmed to receive the bit sequence and, responsive to evaluating the microcontroller as being operable, output the bit sequence to a bus transceiver for transfer over a communication bus, and, responsive to evaluating the microcontroller as being inoperable, replace the bit sequence with a status message bit sequence and output the status message bit sequence to the bus transceiver.

9. The vehicle of claim 8, wherein the microcontroller is further programmed to output a signal to the monitor processor that is indicative of the microcontroller being inoperative.

10. The vehicle of claim 9, wherein the monitor processor is further programmed to, responsive to the signal being indicative of the microcontroller being inoperative, change from outputting the bit sequence to the bus transceiver to outputting the status message bit sequence to the bus transceiver.

11. The vehicle of claim 8, wherein only the microcontroller is electrically coupled to a receive data output of the bus transceiver.

12. The vehicle of claim 8, wherein the status message bit sequence is defined such that each bit is a same constant value.

13. The vehicle of claim 8, wherein the monitor processor is programmed to generate a question bit sequence having a predetermined answer bit sequence and evaluate the microcontroller as being operable responsive to the microcontroller responding to the question bit sequence with an answer bit sequence that matches the predetermined answer bit sequence.

14. The vehicle of claim 8, wherein the monitor processor is programmed to generate a question bit sequence having a predetermined answer bit sequence and evaluate the microcontroller as being operable responsive to the microcontroller responding to the question bit sequence with an answer bit sequence that matches the predetermined answer bit sequence within a predetermined amount of time.

15. The vehicle of claim 8, wherein the bit sequence is based on data received from the bus transceiver and the status message bit sequence is independent of data received from the bus transceiver.

16. A method comprising:
outputting, by a microcontroller, a message bit sequence that includes a subsequence of bits that is responsive to data received from a vehicle network via a bus transceiver;
receiving, by a monitor processor, the message bit sequence;
evaluating, by the monitor processor, an operating status of the microcontroller;
passing, by the monitor processor, the message bit sequence to the bus transceiver for transfer over the vehicle network responsive to the operating status being operable; and
replacing, by the monitor processor, the message bit sequence with a status message bit sequence that is independent of data received from the vehicle network and transferring the status message bit sequence to the bus transceiver responsive to the operating status being inoperable.

17. The method of claim 16 further comprising evaluating, by the monitor processor, the operating status as being inoperable responsive to the microcontroller responding to a question bit sequence with an answer bit sequence that does not match a predetermined answer bit sequence corresponding to the question bit sequence.

18. The method of claim 16 further comprising generating, by the monitor processor, the status message bit sequence such that each bit has a same constant value.

\* \* \* \* \*